United States Patent [19]

Nuzzolo et al.

[11] 4,212,799

[45] Jul. 15, 1980

[54] METHOD FOR PREPARING A PROTEINIC ISOLATE FROM SUNFLOWERSEED MEAL USING ALUMINUM SALTS

[75] Inventors: Carlo Nuzzolo, Rome; Rodolfo Vignola, Monterotondo; Antonio Groggia, Rome, all of Italy

[73] Assignee: Snamprogetti, S.p.A., Milan, Italy

[21] Appl. No.: 41,411

[22] Filed: May 22, 1979

[30] Foreign Application Priority Data

Jun. 2, 1978 [IT] Italy ................................ 24136 A/78

[51] Int. Cl.² .............................................. A23J 1/14
[52] U.S. Cl. .................................. 260/123.5; 426/656
[58] Field of Search ....................................... 260/123.5

[56] References Cited

U.S. PATENT DOCUMENTS

| 2,210,481 | 8/1940 | Brother et al. ............... 260/123.5 X |
| 2,377,853 | 6/1945 | Boyer et al. ....................... 260/123.5 |
| 2,549,526 | 4/1951 | Rowe ................................ 260/123.5 |
| 2,607,768 | 8/1952 | McCready et al. ................ 260/123.5 |
| 3,361,574 | 1/1968 | Paulsen .......................... 260/123.5 X |
| 3,459,555 | 8/1969 | King ................................ 260/123.5 |
| 4,131,607 | 12/1978 | Petit et al. ........................ 260/123.5 |

*Primary Examiner*—Howard E. Schain
*Attorney, Agent, or Firm*—Morgan, Finnegan, Pine, Foley & Lee

[57] ABSTRACT

A method for preparing nontoxic, edible proteinic concentrates adapted also for human nutrition, is disclosed according to which undesirable compounds such as polyphenols (e.g. chlorogenic and caffeic acids) are complexed by aluminum salts to prevent oxidizing these polyphenols to quinones.

It is important that aluminum be constantly kept in soluble form to prevent it from being precipitated together with the proteins when protein-precipitating acidification is carried out.

Citric acid has been found to be the best complexing agent.

7 Claims, No Drawings

METHOD FOR PREPARING A PROTEINIC ISOLATE FROM SUNFLOWERSEED MEAL USING ALUMINUM SALTS

This invention relates to a novel process for isolating proteins from sunflowerseed meal, which is based on the direct extraction of proteins in the presence of the polyphenolic compounds (especially chlorogenic and caffeic acids). These compounds are one of the principal hindrances against the direct use of such meals in human feeding.

As a matter of fact, it is well known that, at the alkaline pH at which proteins are extracted, polyphenols and oxidized to quinones and the latter, by reacting with the proteins, impart to the proteins a dark green hue while concurrently depreciating the nutritional value thereof. For this reason, the extraction of polyphenols is carried out beforehand, both in the case in which it is desired to prepare a protein enriched edible meal (a proteinic concentrate) and in order to be enable to extract the proteins subsequently in an alkaline environment in order that a proteinic isolate may be obtained.

The procedures which have been followed heretofore for the preparation of the proteinic isolates are the indirect procedure, or procedure No. 1, and the direct procedure, or procedure No. 2.

Procedure No. 1

Preliminary removal of the phenols by washing the defatted meal with an organic solvent and subsequently extraction of the proteins with soda. The proteins are then precipitated to their isoelectric point (pH 5) by making them acidic with an inorganic acid such as hydrochloric or sulphuric acid.

Procedure No. 2

Extraction of the proteins with NaOH directly from the meal by employing in the medium a reducing substance ($Na_2SO_3$) which prevents the phenols from being oxidized. The proteins are then isolated by acidic precipitation as in Number 1) above.

The most prominent shortcomings of these procedures are, in the case of No. 1, the cost of the organic solvent to be regenerated, and, in the case of No. 2, the evolution of $SO_2$ (a toxic gas) from $Na_2SO_3$ in the acidification stage and, moreover, the requirement of carrying out washing steps on the end proteins until observing a residual content of $SO_2$ below the values imposed by the Health Authorities.

The method according to the present invention comprises the step of using an aluminium salt (a sulphate or a chloride) in the stage of aqueous extraction of the proteins with NaOH.

The aluminate ion ($AlO^-_2$, or $Al(OH)^-_4$, or $Al(OH)_4(H_2O)^-_2$ which is present at the pH 10.5 of the extraction has the task of complexing the orthobiphenols (i.e. the chlorogenic and the caffeic acids) and of preventing thereby their oxidation to quinones. From the extract, the proteins are then separated with the usual method of precipitation to the isoelectric point (pH 5) by using in the latter stage a compound which is capable of maintaining the aluminium in solution. This is because it is known that at a pH of from 3.5 to 9.5 the insoluble hydroxide, $Al(OH)_3$ is stable, which would otherwise precipitate with the proteins if the complexing agent should not be introduced.

However, in order to have a low Al content (about 200 ppm. or parts per million) in the end proteins (i.e. the isolate) it is required that a double precipitation be carried out, that is, that the proteins should be redissolved with NaOH and precipitated once again the presence of the complexing agent.

The most common among the substance which complex aluminum in solution are citric, tartaric, malic and oxalic acid, the pyrophosphate, polyphosphate and EDTA (sodium salt of the ethylenediaminotetraacetic acid) and acetylacetone. The most efficient complexing agents, that is those for which a high stability constant for the complex with Al is experienced, are EDTA, acetylacetone, citric acid and poliphosphates.

In the process according to this invention, it has proven advantageous to use an acidic complexing agent, inasmuch as it unfolds a twofold action when it is added to the alkaline proteinic extract, viz.: to make acidic the medium down to pH 5 while concurrently forming the soluble Al complex. Citric acid is the most suitable substance, also by virtue of the fact that there are no limitations to its use in foodstuffs both from the point of view of toxicity and of legal prohibitions.

The proteinic isolate as obtained with the instant method is acceptable as regards the color: it is creamwhite at a pH of 5, and is slightly yellow-green at alkaline pH values on account of a small amount of residual polyphenols (0.4%–0.5%) in the freeze-dried isolate) which are strongly bound to the proteins and thus difficult to remove under the non-denaturating conditions employed herein.

The principal assets of this method are:
1. the possibility of using any kind of meal,
2. the high proteinic content of the isolate: 95%,
3. the high protein yield (60%) relative to the total proteins of the material which has been used,
4. the minimum denaturation of the obtained proteins as evidenced by their complete solubility at a pH of from 8 to 8.5.

As regards heading (1) above, the various kinds of meals used are:
(A) meal from dehulled and defatted seeds,
(B) meal from defatted, non-dehulled seeds,
(C) ground whole seeds (thus non-defatted).

In the case of (C) the problem to be solved, as studied by the present Applicants, lies in recovering the oil from the water in which it is dispersed and emulged.

MATERIALS AND METHODS

The various types of meals and seeds belonged, all of them, to the cultivar UNIFLOR 70 sunflower seeds.

PREPARATION OF MEALS

Dehulled (or non-dehulled) seeds were ground at 4° C. in a Sorvall Omnimixer. The extraction of oil was carried out with nor. hexane (1:10, wt/vol ratio) with stirring for 16 hours at room temperature. The slurry was filtered under vacuum on Whatman No. 3 paper. The solids were dried in a nitrogen stream and then ground in a Buhler mill at setting mark 2.

ANALYTICAL METHODS

Moisture, proteinic content ($N \times 6.25$), lipids, crude fiber and chlorogenic plus caffeic acids were determined with the official methods as reported in AOAC (Association Official Analytical Chemists) 12th Edition, 1975. Aluminum was determined with the colorimetric method Chrome & Azurol S (Kashkowskaya and Mustafin, Zavodsk. Lab. 24 (1958), 1189) and by atomic absorption spectroscopy.

EXAMPLE

PREPARATION OF THE PROTEINIC ISOLATE FROM MEAL OF DEHULLED AND DEFATTED SEEDS

The meal employed had the following composition, in % by wt.:
Moisture—10%
Proteins—50%
Lipids—1.5%
Chlorogenic+caffeic acids—4.2%
Crude fiber—4%

20 grams of meal were added to 200 mls of deionized water containing 1 gram of $Al_2(SO_4)_3.18\ H_2O$.

The slurry, stirred at room temperature, was adjusted to a pH of 10.5 with normal NaOH. The solubilization of the proteins was performed for a time of from 30 to 40 minutes at this pH, which was kept constant by adding normal NaOH in increments. The slurry was then subjected either to filtration or centrifugation.

On the filtrate or the supernatant, precipitation of the proteins was effected by adding 5%—aqueous citric acid (0.22 M) to a pH of 5.0. The precipitated proteins were separated from the liquid by centrifugation at a low speed, Reprecipitation of the proteins was then carried out so that the sediment was supplemented by 200 mls of water and the slurry was adjusted to pH 10.5 with normal NaOH until complete solubilization was attained (about 20 minutes). The proteins were then precipitated at pH 5 with citric acid as above. After centrifugation, the sediment was slurried in about 100 mls water, neutralized with soda and freeze dried. The freeze-dried product, 6 grams, was the end proteinic isolate having a proteinic concentration of 95% approx., and a content of polyphenols (chlorogenic+caffeic acids) of about 0.5%.

We claim:

1. A method for the preparation of proteinic isolates from vegetable meals which contain undesirable compounds, comprising the steps of directly extracting the proteins with alkaline aqueous solutions while concurrently complexing such undesirable compounds with an Al salt, and subsequently precipitating the proteins by acidification to the isoelectric point in the presence of a compound capable of maintaining aluminum in solution, redissolving the proteins and precipitating them again still in the presence of the compound capable of maintaining aluminum in solution.

2. Method for the preparation of proteinic isolates according to claim 1, characterized in that the vegetable meal is sunflowerseed meal and the undesirable compounds are polyphenols.

3. Method for the preparation of proteinic isolates according to claims 1 or 2, characterized in that the extraction is carried out with a solution of sodium hydroxide.

4. Method for the preparation of proteinic isolates according to any one of claims 1, 2 or 3, characterized in that the compound capable of maintaining aluminium in solution is citric acid.

5. Method for the preparation of proteinic isolates according to any one of claims 1, 2, 3, or 4 characterized in that the acidification to pH 5 is obtained by means of the same citric acid.

6. A method according to claim 1 wherein the Al salt is AlCl3 or Al2(SO4)3.

7. A method according to claim 2 wherein the polyphenol is chlorogenic acid or caffeic acid.

* * * * *